Patented Jan. 19, 1937

2,068,372

UNITED STATES PATENT OFFICE 2,068,372

PREPARATION OF ARALKYLAMINO-ANTHRAQUINONE COMPOUNDS

Edwin C. Buxbaum, Shorewood, Wis., assignor to E. I. du Pont de Nemours & Company, Wilmington, Del., a corporation of Delaware No Drawing. Application March 25, 1936,
Serial No. 70,892

10 Claims. (Cl. 260—60)

This invention relates to the preparation of new aralkylaminoanthraquinone compounds and to the process for preparing the same.

I have found that new and valuable aralkylaminoanthraquinones which have affinity for cellulose acetate silk and which have sufficient solubility in aliphatic hydrocarbons to render them suitable for the coloring of gasoline and similar materials can be obtained when aminoanthraquinones are reacted with aralkyl halides, sulfates or alcohols. According to this invention 1,4,8-triaminoanthraquinone or 1,4,5,8-tetraminoanthraquinone can be partially or completely aralkylated to give a variety of aralkylaminoanthraquinone compounds. The invention is also applicable to the preparation of diaralkylaminoanthraquinones, such as 1-dibenzylaminoanthraquinone and 1,4-di-(dibenzylamino)-anthraquinone, which are new compounds and which have not been obtainable by the processes heretofore described.

It is therefore an object of this invention to prepare new aralkylaminoanthraquinone compounds which are suitable for use as colors for cellulose acetate and for liquid hydrocarbons, such as gasoline.

It is a further object of this invention to provide a process for preparing these new compounds and one which permits the introduction of two aralkyl groups in each amine radical present in the aminoanthraquinone compound.

According to the present invention aminoanthraquinones are reacted with aralkyl halides or sulfates at temperatures of from 100° C. to about 200° C. in the presence of an alkali. Where only monobenzylation of any one or more of the amino groups present on the anthraquinone molecule is to be effected the temperature used should not be above about 140° C. To partially benzylate a polyaminoanthraquinone the benzylating agent is used in an amount only slightly in excess of that theoretically required. Where the dibenzylaminoanthraquinones are produced the temperature of the reaction should be above 160° C. In all cases the presence of an alkali is desirable, although it is essential in the preparation of the diaralkylamino compounds.

The following examples are given to more fully illustrate the invention. The parts used are by weight.

Example 1

100 parts of 1,4,5,8-tetraminoanthraquinone are suspended in 300 parts of benzyl chloride containing 80 parts of sodium carbonate. The mixture is heated to 140-145° C. for four hours, cooled, diluted with alcohol and isolated in the usual manner. A dark blue powder, 1,4,5,8-tetrabenzylaminoanthraquinone is obtained which dissolves in organic solvents to a blue color.

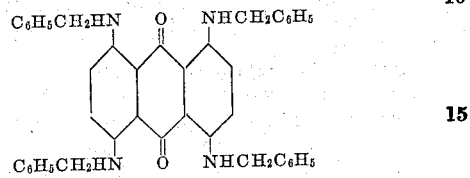

If in the above example the temperature is raised to 175° C. a product of the following formula is obtained

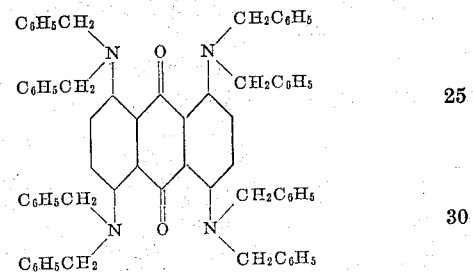

This compound is soluble in organic solvents with a yellow green color. 1,4,5-triaminoanthraquinone may be similarly treated to give products which dye cellulose acetate in blue shades.

Example 2

100 parts of 1,4-diaminoanthraquinone are suspended in 400 parts of benzyl chloride and 65 parts of sodium carbonate are added. The mixture is heated to a reflux temperature and maintained there until there is no further change in color. During the heating the color changes from violet red to blue. The mass is cooled to 60° C. and allowed to agitate for four hours. The reaction mass is then cooled to 30° C. and held for twelve hours, filtered, and washed free of benzyl chloride with ethyl alcohol. The 1,4-di-(dibenzylamino) compound formed is soluble in organic solvents with a blue color and dyes cellulose acetate a reddish blue. The product has the formula

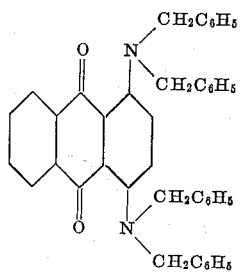

Example 3

25 parts of 1-aminoanthraquinone are suspended in 100 parts of benzyl chloride and 10 parts of sodium carbonate are added. The mixture is refluxed for six hours at 170–180° C. and then cooled to 60° C., diluted with 100 parts of ethyl alcohol and filtered. The 1-dibenzylaminoanthraquinone formed is washed with 200 parts of hot water and dried. It is a red crystalline powder. It gives a red solution in benzene.

Example 4

53.6 parts of 1,4,5,8-tetraminoanthraquinone are added to 200 parts of phenol heated to 80° C. 25 parts of soda ash and 0.5 part of basic copper acetate are added. 27.8 parts of benzyl chloride are then added over a period of one-half hour. The mixture is heated to 100° C. and held for two to four hours. The reaction mass is then cooled to 60° C. and diluted with twice its volume of ethyl alcohol. The diluted mass is filtered warm, washed with alcohol and hot water and dried.

The 1-benzylamino-4,5,8-triaminoanthraquinone so obtained dyes acetate cellulose in greenish-blue shades of good fastness to light.

Similarly, by employing approximately 10% excess of benzyl chloride over the theoretical amount, the following compounds can be prepared: 1,5-di-(benzylamino)-4,8-diaminoanthraquinone, 1-amino-4,5,8-tri-(benzylamino)-anthraquinone and 1,4,5,8-tetra-(benzylamino) anthraquinone.

Example 5

10 parts of pure 1,4-diaminoanthraquinone are added to 100 parts of nitrobenzene to which has been added 5 parts of sodium carbonate and 0.5 part of basic copper acetate. 20 parts of paranitrobenzyl chloride are then added and the mixture heated to 190–200° C. for six hours. The mixture is cooled to 70° C., diluted with alcohol and filtered. The 1,4-di-(para-nitrobenzylamino)-anthraquinone is washed with hot water and dried. By reducing this compound with sodium sulfide 1,4-di-(para-amino-benzylamino)-anthraquinone is obtained. Similarly, by starting with 1,8-diamino-4,5-dihydroxyanthraquinone there is obtained 1,8-di-para-(nitrobenzylamino)-4,5-dihydroxyanthraquinone which can also be reduced with sodium sulfide to 1,8-di-(para-amino-benzylamino)-4,5-dihydroxyanthraquinone. The color of this compound in organic solvents is blue.

Example 6

100 parts of 1,4,5,8-tetraminoanthraquinone are suspended in 400 parts of benzyl alcohol. The mass is refluxed around 200° C. for four hours and cooled to 65° C. About 800 parts of methyl alcohol are added and the mixture held at 50° C. for one hour. The mass is filtered, washed and dried. The 1,5-di-(benzylamino)-4,8-diaminoanthraquinone so obtained dyes cellulose acetate a brilliant greenish-blue of excellent fastness to light. Benzyl chloride or benzyl sulfate may be used in place of benzyl alcohol in this example to give the identical product. Only a small excess of that theoretically required should be employed.

1,4,5-triaminoanthraquinone may also be partially benzylated to give products which dye cellulose acetate in blue shades.

Example 7

53.6 parts of 1,4,5,8-tetraminoanthraquinone are added to 200 parts of nitrobenzene to which have been added 25 parts of sodium carbonate and 28 parts of benzyl chloride. The reaction mass is heated to 170–180° C. for six hours or until the reaction is completed. The mass is cooled to 60° C. and diluted with ethyl alcohol, filtered, washed with hot water and dried. The 1-benzylamino-4,5,8-triaminoanthraquinone formed dyes cellulose acetate in greenish-blue shades.

I claim:

1. A polyaminoanthraquinone containing at least three amino groups in alpha positions in which at least one alpha amino group contains an aralkyl radical.

2. A 1,4,5,8-tetraminoanthraquinone, in which at least one amino group contains an aralkyl radical.

3. 1,5-di(aralkylamino)-4,8-diaminoanthraquinone.

4. 1,5-di(benzylamino)-4,8-diaminoanthraquinone.

5. 1-benzlyamino-4,5,8-triaminoanthraquinone.

6. An alpha diaralkylaminoanthraquinone.

7. The process which comprises heating to reaction temperature an alpha-aminoanthraquinone with a compound of the class consisting of aralkylhalides and aralkylsulfates in the presence of an alkali.

8. The process for preparing diaralkylaminoanthraquinones which comprises heating an alpha-aminoanthraquinone with a compound of the class consisting of aralkylhalides and aralkylsulfates in the presence of an alkali metal carbonate at a temperature above 160° C.

9. The process which comprises heating 1,4,5,8-tetraminoanthraquinone with benzyl chloride in the presence of an alkali at a temperature ranging from about 100° C. to reflux temperature.

10. The process which comprises heating 1,4,5,8-tetraminoanthraquinone with benzyl chloride in the presence of an alkali at a temperature above 160° C.

EDWIN C. BUXBAUM.